United States Patent
Petersson et al.

(10) Patent No.: US 6,939,396 B2
(45) Date of Patent: Sep. 6, 2005

(54) AMBIENT AIR POLLUTION TRAP (75) Inventors: Martin Petersson, stra Frlunda (SE); Jan Ke Karlsson, stra Frlunda (SE)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 10/354,430

(22) Filed: Jan. 31, 2003

(65) Prior Publication Data

US 2004/0149129 A1 Aug. 5, 2004

(51) Int. Cl.$^7$ .............................................. B01D 53/04
(52) U.S. Cl. ..................... 96/130; 96/146; 55/385.3; 123/520
(58) Field of Search .................. 95/8, 11, 12, 14, 95/19, 21, 143, 148; 96/111–115, 130, 146; 55/385.3; 123/518–520

(56) References Cited

U.S. PATENT DOCUMENTS

| | | | | |
|---|---|---|---|---|
| 3,884,204 A | * | 5/1975 | Krautwurst et al. | 123/519 |
| 5,004,487 A | * | 4/1991 | Kowalczyk | 96/127 |
| 5,221,292 A | * | 6/1993 | Aoyama | 96/142 |
| 5,350,444 A | * | 9/1994 | Gould et al. | 96/154 |
| 5,629,477 A | * | 5/1997 | Ito | 73/118.1 |
| 5,683,478 A | * | 11/1997 | Anonychuk | 55/385.3 |
| 5,927,084 A | | 7/1999 | Fielding | |
| 6,212,882 B1 | * | 4/2001 | Greger et al. | 60/274 |
| 6,349,707 B1 | * | 2/2002 | Neumann et al. | 123/520 |
| 6,423,118 B1 | * | 7/2002 | Becerra et al. | 95/19 |
| 6,637,193 B2 | * | 10/2003 | Oku et al. | 60/283 |
| 6,701,902 B2 | * | 3/2004 | Koyama et al. | 123/519 |
| 2002/0124836 A1 | * | 9/2002 | Reddy | 123/518 |
| 2002/0148354 A1 | * | 10/2002 | Amano et al. | 96/112 |
| 2003/0167925 A1 | * | 9/2003 | Aikawa et al. | 96/126 |
| 2004/0003723 A1 | * | 1/2004 | Ueno et al. | 96/110 |

FOREIGN PATENT DOCUMENTS

| | | |
|---|---|---|
| DE | 3314997 | 10/1984 |
| DE | 19728569 | 1/1998 |
| FR | 2744375 | 8/1997 |

* cited by examiner

Primary Examiner—Robert H. Spitzer
(74) Attorney, Agent, or Firm—Diana D. Brehob (57) ABSTRACT

The invention relates to a method and an apparatus for cleaning ambient air of a vehicular adsorption unit (8). The vehicle includes a combustion engine (1) and a passenger ventilation system (5, 6, 7, 8, 9, 10, 11). Adsorption takes place whether the engine (1) is running or not. During adsorption, a fan (11) forces ambient air from an inlet (6) to the ventilation system in a first direction, through an adsorption unit (8), and out of an outlet (10). To desorb when the engine is running, air is supplied to a heater (13). Heated air is passes through the adsorption unit (8) to release pollutants and regenerate the unit. Pollutant containing air passes through a second heater (4, 16) and then through the first heater (13) to heat the ambient air. Finally, polluted air is drawn from the heat exchanger (13) to an intake conduit (3) of the engine (1).

10 Claims, 6 Drawing Sheets

AMBIENT AIR POLLUTION TRAP

FIELD OF THE INVENTION

The current invention relates to a method for removing pollutants, such as hydrocarbon compounds, from ambient air by an adsorption unit arranged in a vehicle provided with a combustion engine and a ventilation system for a passenger compartment.

BACKGROUND OF THE INVENTION

Recent methods have instead been aimed at purifying ambient air and polluted air from other vehicles. U.S. Pat. No. 6,200,542 discloses a method for breaking down ozone. According to the known method, a catalytic coating is applied to the radiator and other surfaces in the engine compartment. When the ozone comes into contact with these surfaces it is converted to oxygen.

A further known method, described in EP 1082990, uses a HC trap adjacent to the radiator for adsorbing pollutants from the ambient air while the vehicle is moving. The adsorbing process is followed by desorption by passing heated intake air through the trap to an intake conduit of the engine. This apparatus is operated when the vehicle is moving.

However, none of the known methods disclose a method for using the ventilation system for cleaning ambient air by adsorption of hydrocarbons while the vehicle is either stationary, with the ignition switched off, or moving, combined with desorption and combustion of hydrocarbons when the vehicle is moving.

In addition, both known apparatuses are directly exposed to a flow of ambient air and will be sensitive to particles of dirt, tarmac and dust settling on the active surfaces.

DISCLOSURE OF THE INVENTION

The current invention relates to a method for removing pollutants, such as hydrocarbon compounds, from ambient air by an adsorption unit arranged in a vehicle, which vehicle includes a combustion engine and a ventilation system for a passenger compartment. According to the method, adsorption takes place mainly when the vehicle is stationary, preferably with the ignition switched off, whereby a fan in the ventilation system is operated when at least one predetermined condition is fulfilled, and partly when the vehicle is moving with the ventilation system in operation. The fan draws ambient air into the ventilation system in a first direction, through an adsorption unit provided in said system.

Subsequent regeneration of the adsorption unit takes place when the vehicle is operated, with the ignition switched on. Air is supplied to a first heating means, preferably, a first heat exchanger, where it is heated. The heated air is then passed through the adsorption unit to release the pollutants and regenerate the unit. Preferably, the heated air is supplied in the reverse direction to the normal flow of air through the apparatus. The air containing pollutants is passed through a second heating means, whereby the hot air stream is passed through the first heat exchanger to heat the air from the first source of ambient air. Finally, the polluted air is drawn from the heat exchanger to an intake conduit of the combustion engine. In this way the pollutants can be burnt in a combustion chamber of the engine and any remaining pollutants may be destroyed in the existing catalytic converter of the vehicle exhaust system.

The temperature for releasing the pollutants in the adsorbing unit depends on the type of pollutant to be adsorbed, the choice of material in the filter of the adsorbing unit, and the quality of the filter material. The latter will decide the pollution levels at which the adsorption unit can operate. Also, for filter materials adapted for very low pollution levels the pollutants will bond strongly to the filter material. An example of low pollution levels are concentrations of pollutants down to one or a few parts per million (ppm). Such a bond can only be broken by heating the filter material to a relatively high temperature. An example of such materials are certain high grade active carbons used for adsorbing NMOG. Consequently, a lower grade material will require less heating, but will only adsorb at relatively high concentrations of pollutants. In this context, a relatively high temperature is 120–140° C., while a relatively low temperature is 80–90° C.

To initiate cleaning of ambient air when the vehicle is stationary, one predetermined condition is that the level of the pollutants, such as hydrocarbons, in the ambient air exceeds a set limit. Alternatively, the apparatus is set to operate during certain times of the day when the pollution levels are known or likely to be high, such as the rush hour during the morning and afternoon as well as the time in-between.

To avoid running down the battery of the vehicle, the fan may be powered by alternative sources of electricity, such as a solar panel, when the vehicle is stationary.

Preferably the second heating means, or heat exchanger, for heating the polluted air, which in turn heats the air used for regenerating the adsorption unit, is an exhaust manifold attached to said engine. The exhaust manifold is preferably provided with a surrounding cover to make it double walled. This double walled exhaust manifold provides the second heat exchanger. Alternatively, other heating means, such as electric heaters are used.

The ambient air cleaned by the adsorption unit is preferably used to ventilate the passenger compartment, as the existing ventilation conduits may be used for the apparatus. During regeneration, the air is passed through the adsorption unit in a direction opposite to said first direction. As stated above, the air is preferably supplied from the passenger compartment for the existing ventilating ducts to be used.

When the vehicle is moving, the ambient air may be cleaned as soon as air passes through the ventilation system, either with the aid of the fan or by the increased air pressure in front of the vehicle caused by the forward movement of the vehicle. This airflow is dependent on the selected setting of the existing ventilation controls on the dashboard, but both settings will cause air to flow through the ventilation system.

In this way the fan, ducts and conduits of the existing ventilation system is used with very few alterations.

As the adsorption unit forms a part of the passenger compartment ventilation system, regeneration is performed when at least one predetermined condition is fulfilled. One such predetermined condition is that the amount of pollutants adsorbed by the adsorption unit exceeds a set level, or that the system has been operated for a predetermined period of time. A further predetermined condition is that the inlet and outlet of the ventilation system are closed. The ventilation conduits leading into and out of the adsorption unit are each provided with an additional conduit, for heated air and polluted air, respectively. This apparatus forces the heated air through said unit and prevents polluted air from escaping through the ventilation system inlet and the passenger compartment air filter. A further condition is that the engine and its catalytic converter must have reached their normal operating temperatures, so that heating of the engine after a cold start is not delayed by the regeneration process.

An alternative embodiment of the regeneration apparatus described above uses only the second heat exchanger, that is the double walled exhaust manifold for heating ambient air. In this case, the heated ambient air is drawn directly through the adsorbing filter during regeneration. However, due to the higher temperature of the air leaving the second heat exchanger, a means for controlling this temperature is required. In one alternative, this means is a further heat exchanger a valve apparatus for injecting additional ambient air to lower the temperature. In the latter case, this eliminates the need for more than one heat exchanger.

According to a further embodiment, a second adsorbing filter is provided for collecting pollutants in the exhaust during a cold start of the engine. After a period of time, the existing catalytic converter reaches its light-off temperature and the second adsorbing filter is disconnected from the exhaust conduits of the engine. The second adsorbing filter can be connected to the conduits used for regeneration of the first adsorbing filter, by a number of controllable valves. The valves are arranged to connect each filter to the inlet manifold in turn. When required, the second adsorbing filter can be cleaned as described above.

BRIEF DESCRIPTION OF THE DRAWINGS

In the following text, the invention will be described in detail with reference to the attached drawings. These drawings are used for illustration only and do not in any way limit the scope of the invention. In the drawings.

DETAILED DESCRIPTION

In the following text a number of embodiments will be described in detail. When describing the direction of the flow of air, the terms "upstream" and "downstream" are defined to apply to the instantaneous direction of flow. Because the direction of flow is reversed between adsorbing and desorbing modes, a first device may be placed upstream of a second device in the adsorbing mode and downstream of the same device in the desorbing mode.

The description below describes a method and an apparatus for removing pollutants, such as hydrocarbon compounds, from ambient air by means of an adsorption unit arranged in a ventilation system for a passenger compartment in a vehicle provided with a combustion engine.

Figure 1:
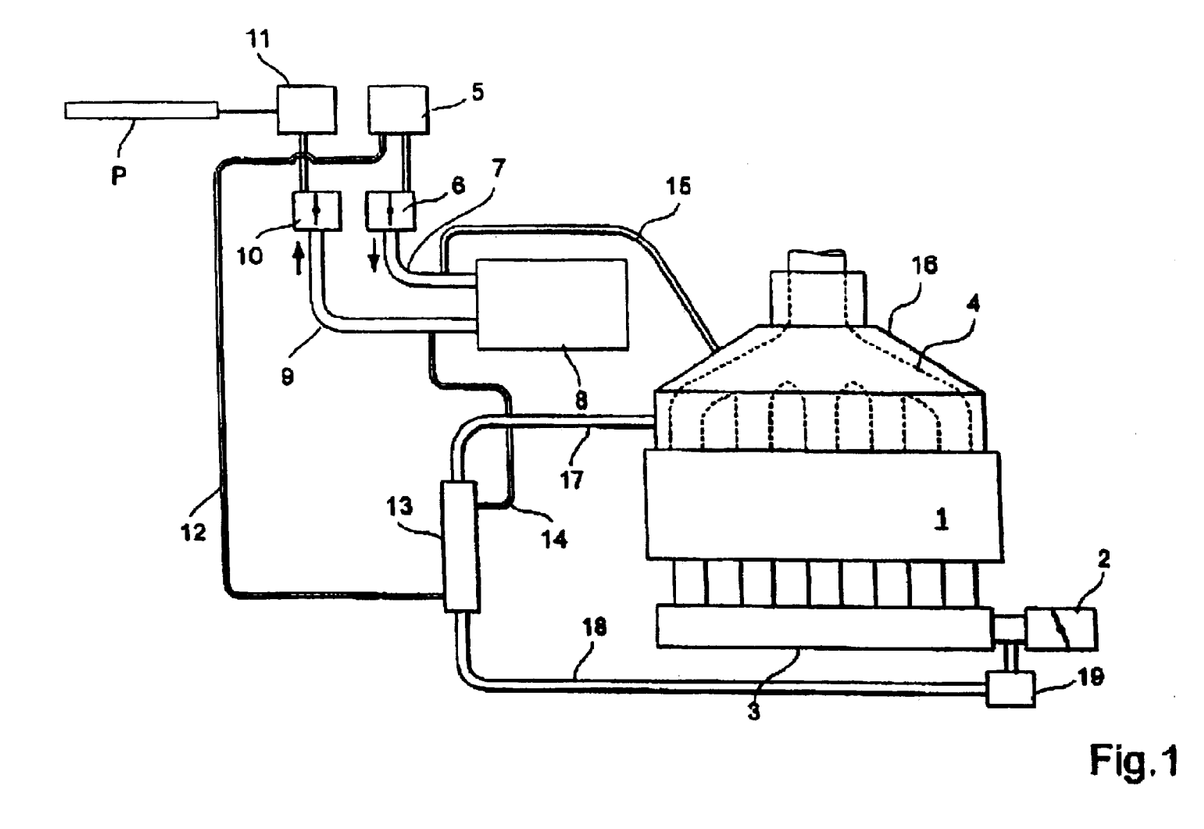
FIG. 1 shows an apparatus according to the invention during normal, ventilating operation.

FIG. 1 shows a multicylinder internal combustion engine 1 with an intake conduit provided with a main throttle 2. From the throttle 2, intake air passes through an inlet manifold 3 connected to each cylinder. The combusted exhaust gases leave the engine through an exhaust manifold 4. In this case, the exhaust manifold 4 is double walled to enable an air stream to be heated without coming into contact with the exhaust gases. This is achieved by enclosing the exhaust manifold 4 within an outer casing 16, allowing an air stream to flow between the exhaust manifold and the casing. This apparatus will be described in more detail below. The exhaust gases subsequently pass through a conventional catalytic converter and a silencing apparatus (not shown), out into the atmosphere.

The vehicle is further provided with a ventilation system for ventilating a passenger compartment. The ventilation system comprises an air filter 5 for ambient air, which filter removes small particles, pollen, etc. from the air drawn into the ventilating system. During an adsorption mode, ventilating air is drawn into the air filter 5 from the ambient atmosphere. From the air filter 5 the ventilating air is drawn through a first control valve 6 and a first ventilating duct 7, into a filter 8 for adsorbing hydrocarbon. Apart from preventing harmful particles from reaching the passenger compartment, the air filter protects the adsorbing filter and prevents it from becoming clogged by dust and other such particles. The hydrocarbon-adsorbing filter 8 preferably contains active carbon or a zeolite. Other suitable adsorbent or adsorbent materials may be used depending on the pollutant to be adsorbed. The cleaned air is then drawn through a second ventilating conduit 9 and a second control valve 10 by a ventilating fan 11. Finally, the fan 11 blows the ventilating air is through the existing ventilating ducts and ventilator outlets (not shown) into the passenger compartment. An advantageous side effect of the invention is that the passenger compartment is ventilated when the system is in operation. This cools the passenger compartment in a warm climate and reduces humidity in a cold climate.

According to the preferred embodiment described above, the ventilation system includes both an air filter 5 and a hydrocarbon-adsorbing filter 8. However, it is also possible to eliminate the separate air filter 5 by using the hydrocarbon-adsorbing filter 8 as a combined air filter and adsorbing filter. In one embodiment, the combined filter unit is provided with an integrated housing, with a replaceable air filter section immediately adjacent the hydrocarbon-adsorbing section to achieve the above protective function.

Figure 3:
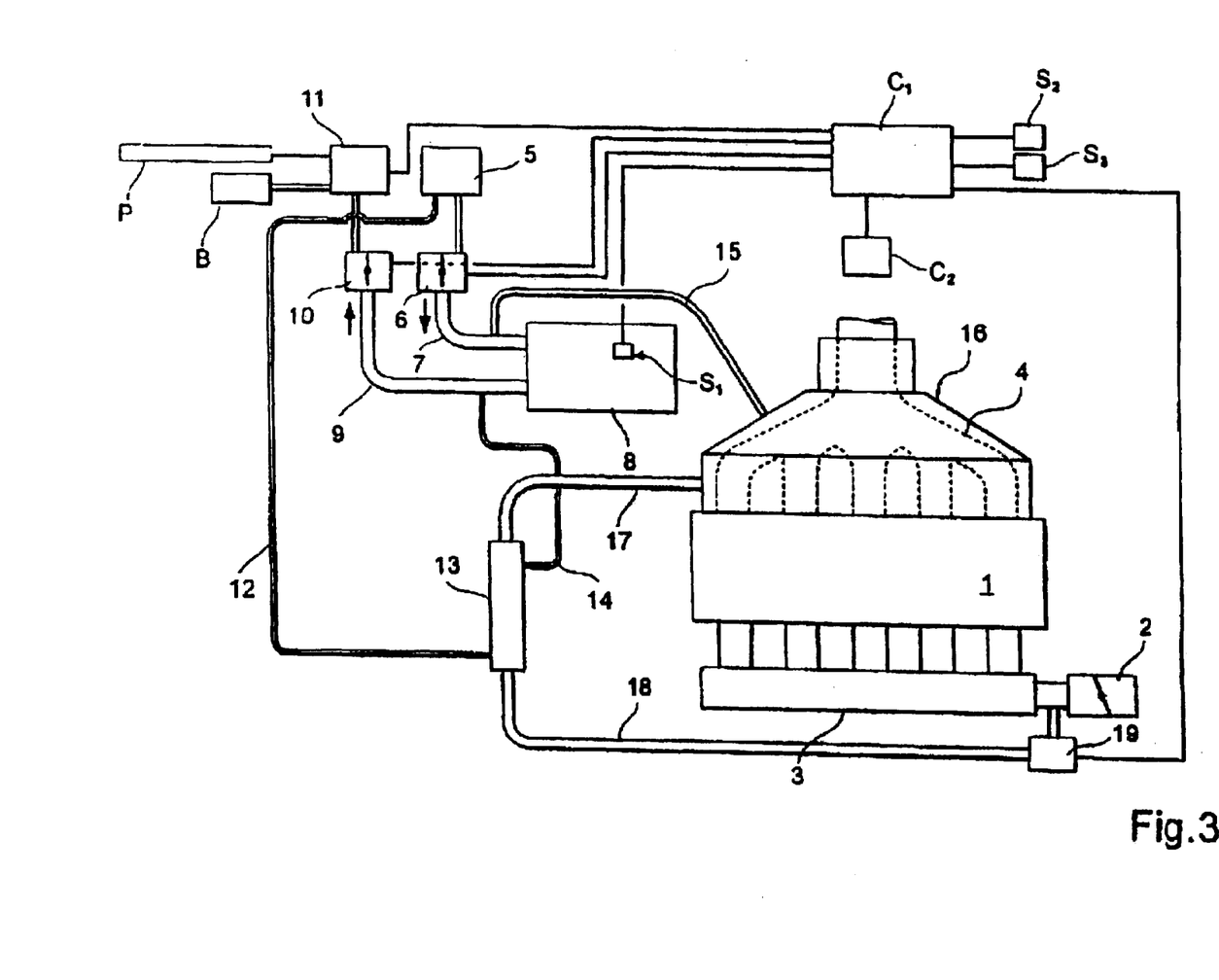
FIG. 3 shows a schematic control diagram for the apparatus according to the invention.

The above apparatus is mainly operated when the vehicle is stationary, that is, when it is parked with the ignition switched off. This enables the filter 8 to adsorb hydrocarbons from the ambient air while the vehicle is not in use. Control of the operation of the system is preferably achieved by means of a sensor, which monitors the level of pollution or concentration of hydrocarbon in the ambient air surrounding the vehicle. Such a sensor apparatus is shown in FIG. 3. The sensor trigger level is set at the factory, or at the point of sale, to adapt the system to different markets, local conditions, or current regional or national legislation.

Figure 4:
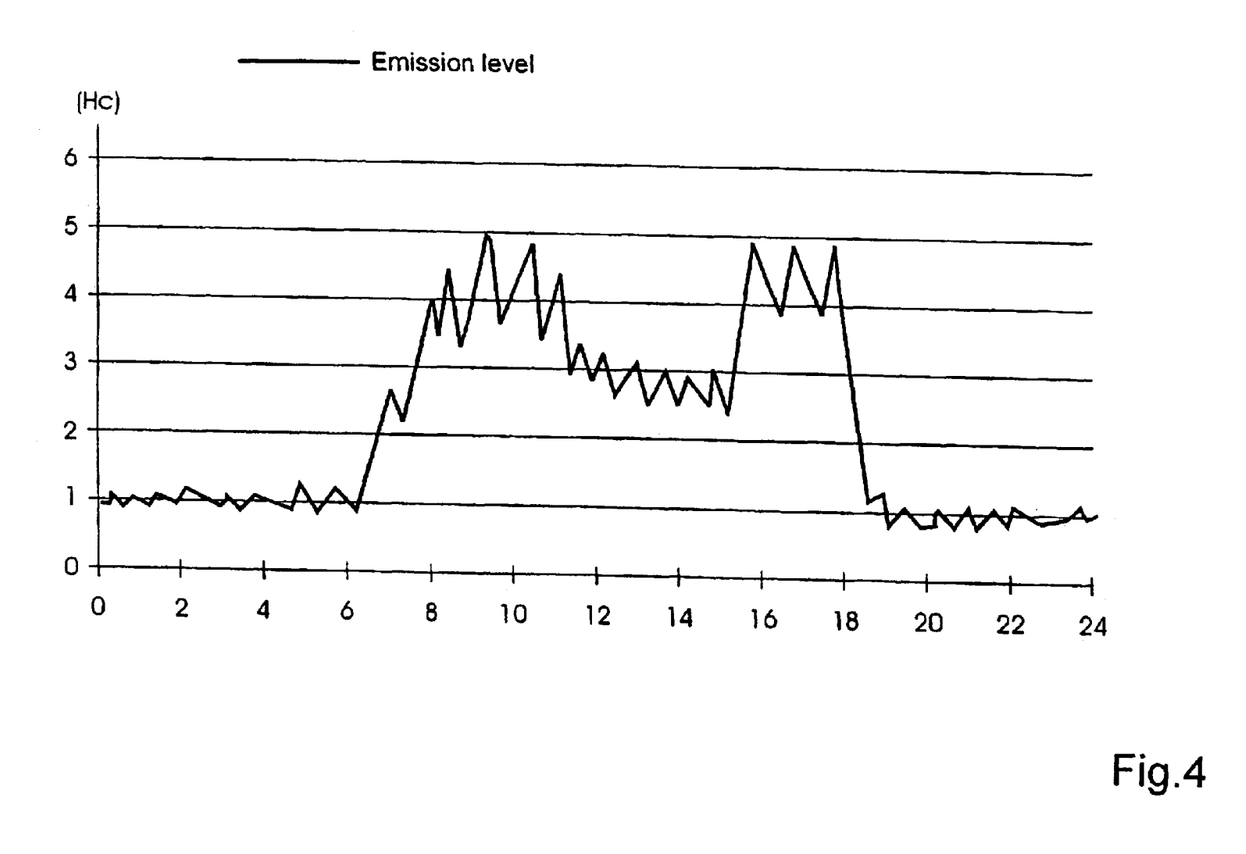
FIG. 4 shows a graph of pollution levels in a city over a 24-hour period.

Alternatively, the system is provided with a timer set to switch the system on during those times of day when the level of pollution is known to be high. These levels vary among cities and regions, but as a rule the pollution level follows the commuting traffic. During a normal working day in an average city, levels begin to rise at about 6:00, peak between 7:00 and 9:00, drop slightly during the day. The levels peak again between 16:00 and 18:00 before dropping down to normal levels around 19:00. FIG. 4 shows a graph of pollution levels over a 24-hour period for a typical city.

Whether the vehicle uses a timer or a sensor, this allows an average stationary vehicle to adsorb hydrocarbons from the ambient air during 7–8 hours each working day. The capacity of the filter is selected to adsorb a predetermined concentration of hydrocarbons from the ambient air for a least such a period of time, without becoming saturated between successive regenerations. This capacity is calculated by using the capacity of the ventilating fan, the expected maximum pollution level and the longest period of tie over which the fan is expected to operate.

As the vehicle, according to this example, is stationary when the adsorbing process is being performed, power is provided to the system without draining the standard battery pack used for starting the vehicle. Most of this power used for operating the fan. Other parts, such as various controllable valves and sensors, are also supplied with electric power. In the example shown in FIG. 1, a solar panel P mounted on the vehicle is used for this purpose.

In one embodiment, power is supplied from other sources of renewable energy, an external plug-in source, an additional rechargeable battery pack in the vehicle or a combination of the above. Such a combination of the above alternatives may be used for special cases, such as when a heavy snowfall covers the solar panel, making it inoperative. An additional power source B of this type is indicated in FIG. 3.

The above examples describe the apparatus for a stationary vehicle. When the vehicle is moving, the ambient air is either drawn through the ventilation system as described above, with the fan powered by a generator or a rechargeable battery in the vehicle, or forced through the system by the air pressure built up in front of the vehicle as it travels forward. As stated above, the hydrocarbon adsorbing filter 8 has a limited capacity for adsorbing pollutants and is regenerated before it reaches its maximum storage capacity and becomes saturated. The regeneration process is initiated when a signal from a sensor $S_1$ in the filter 8 indicates that the amount of hydrocarbon has exceeded a predetermined level.

Alternatively, regeneration is initiated when a system controlled by an ambient air pollution sensor $S_2$ has been operated for a predetermined period of time. In this embodiment it is assumed that the filter unit is approaching saturation when the fan has been operated for a predetermined period of time, during which the sensed ambient air pollution level is above the pre-set trigger limit.

Regeneration of the filter 8 takes place when the engine is running and has reached its normal operating temperature. Immediately after a cold start, the exhaust manifold is not sufficiently warm and the catalytic converter has not reached its light-off temperature. Hence, the regeneration is not performed until a signal from an existing engine management system confirms that the light-off temperature has been reached (see FIG. 3). During regeneration, the first and second control valves 6, 10 are arranged to close the inlet and outlet of ventilating air to and from the first and second ventilating ducts 7, 9 respectively. These inlet and outlet valves are temporarily closed to isolate the filter from the ventilation system when a regeneration of the hydrocarbon-adsorbing filter is being performed. As closure of the control valves 6, 10 interrupts the flow of air into the passenger compartment, the regeneration cycle is adapted to operate without causing inconvenience or discomfort for the occupants. In a preferred embodiment, an existing passenger compartment air recirculation function is used during regeneration. This type of function is available in most modern vehicles and is commonly used for preventing exhaust fumes from entering the compartment in tunnels or in slow moving traffic. As the regeneration cycle typically takes 1–5 minutes to purge the filter unit, it is unlikely to be noticed by the passengers.

The function can also be achieved either by an intelligent central processing unit CPU having sensors $S_3$ humidity and temperature in the compartment, to decide when the regeneration cycle can be started, or by providing the system with a bypass duct to allow the fan to draw air directly from the air filter 5 during the regeneration cycle. A further alternative could be to provide the system with an additional adsorbing filter that would be used during regeneration.

Figure 2:
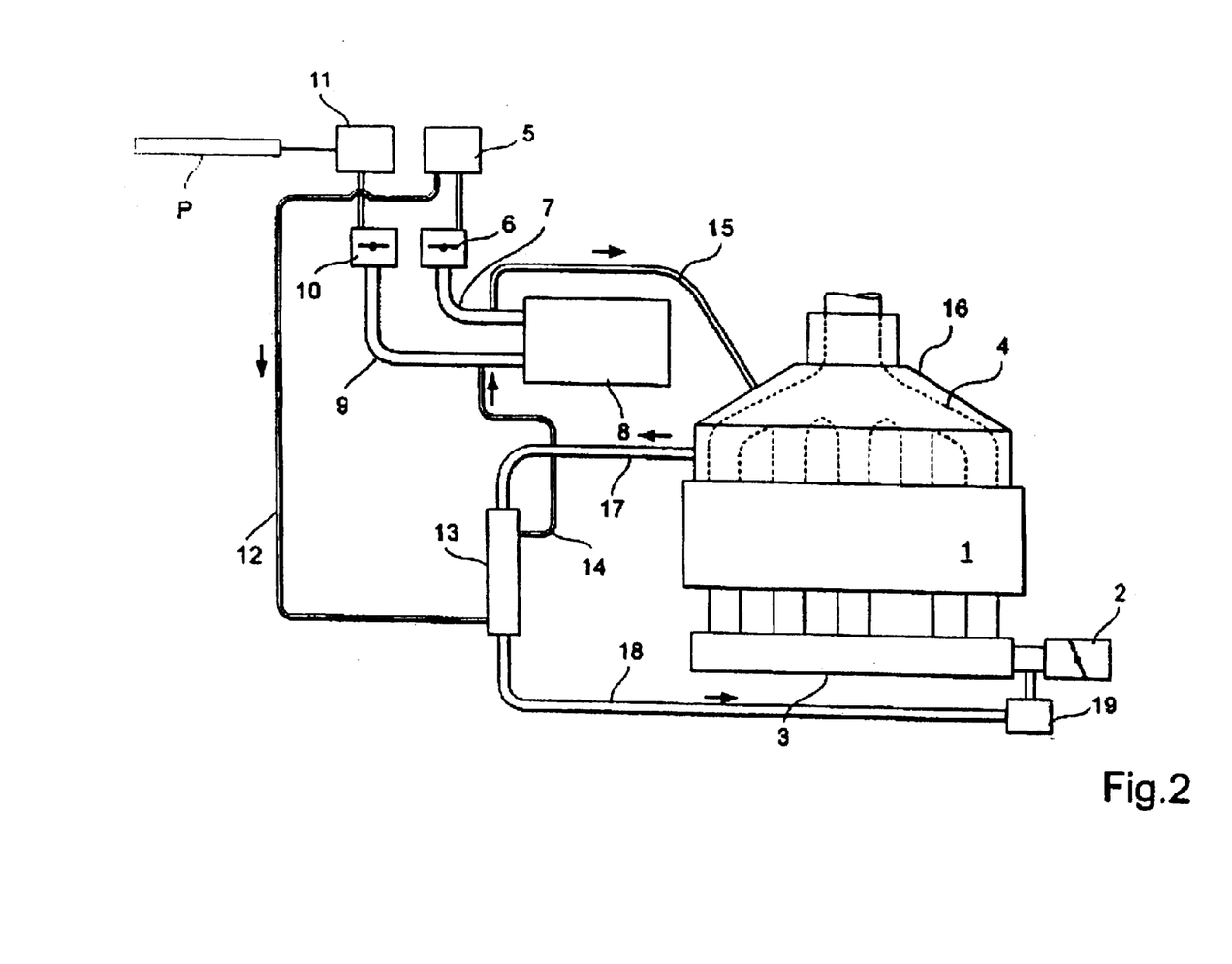
FIG. 2 shows the apparatus of FIG. 1 during regeneration of an adsorption unit.

The flow of air through the system during a regeneration mode is shown in FIG. 2. As soon as the first and second control valves 6, 10 are closed, a third control valve 19 is arranged to open to provide a source of low pressure from the intake manifold 3 of the engine 1. This low pressure causes ambient air to be drawn from the atmosphere, through the compartment air filter 5 and into a first regeneration duct 12. The air is then drawn through a first heat exchanger 13, where it is heated to a temperature sufficiently high to cause hydrocarbons to be released from the adsorbing filter 8. Typically, the temperature for this purpose is 120–150° C. However, to prevent the filter unit 8 from being poisoned by heavy hydrocarbon fractions, regeneration at elevated temperatures, such as 200° C., is conducted at regular intervals, e.g., every $10^{th}$ regeneration cycle. Hydrocarbon poisoning eventually causes the filter to become inoperative.

The heat exchanger can be of any suitable type, such as a tubular or a plate heat exchanger, preferable of the counter-flow type. From the first heat exchanger 13, the heated ambient air is drawn through a second regeneration conduit 14 that is connected to the second ventilating duct 9. The heated air then passes through the hydrocarbon-adsorbing filter 8 in the opposite direction to the normal ventilating airflow. When passing through the filter 8, the hot air causes the hydrocarbons to release from the adsorbent material and mix with the flowing air. The mixture of air and hydrocarbons is drawn through a third regeneration conduit 15 connected to the first ventilating duct 7, and into a second heat exchanger 4, 16. This heat exchanger comprises a double walled exhaust manifold 4, 16, which comprises a surrounding cover 16 that encapsulates a section of the exhaust manifold 4 from the side of the engine past a point where the branches of the manifold are joined. When passing the exhaust manifold 4 the mixture of air and hydrocarbons is heated to a temperature sufficient to raise the temperature of the ambient air in the first heat exchanger 13 to the levels stated above. The heated mixture is drawn from the double walled exhaust manifold 4, 16 to the heat exchanger 13 via a fourth regeneration conduit 17. After heating the ambient air to be supplied to the adsorbing filter 8, the mixture of air and hydrocarbons is drawn through a fifth regeneration conduit 18 and a the third control valve 19 into the inlet manifold 3 of the combustion engine 1. In this way the hydrocarbons are combusted in the engine 1 and any residual products are handled by the conventional catalytic converter.

By reversing the direction of flow during regeneration, it is ensured that no pollutants will be drawn into the passenger compartment. When the adsorption mode is resumed, any pollutants remaining in the first ventilation duct 7 or the third regeneration conduit 15 will simply be drawn back into the, adsorbing filter 8.

According to a further embodiment, the heating of the ambient air is performed by the second heat exchanger alone. In this embodiment, ambient air is supplied to the adsorbing unit, during adsorption mode, or drawn directly to the double walled heat exchanger to be heated by the exhaust manifold, during desorption mode. The supply of ambient air is controlled by a valve immediately after the air filter, or drawn from the air filter and a separate source of ambient air. The heated air is drawn through the adsorbing filter and onwards to the intake manifold, as described above. However, as the temperature of the exhaust manifold can vary between 400–950° C. for a petrol engine (250–800° C. for diesel engines), the temperature of the air leaving the double walled, second heat exchanger is controlled to avoid overheating of the adsorbing filter. This can be achieved by a cooling means, such as a heat exchanger, but more preferably by an apparatus for injecting varying amounts of ambient air (not shown). This can be achieved by means of a controllable valve and a temperature sensor (not shown) placed between the manifold heat exchanger and said valve. The central processing unit (see FIG. 3, "$C_1$") could then control the valve to inject ambient air into the heated airflow and modify its temperature based on the signal from the temperature sensor.

Regeneration of the hydrocarbon adsorbing filter 8 takes place when the engine is operated at low load, which is the most common operating condition for a vehicle driven by an internal combustion engine. At low load, the pressure in the intake pipe or manifold 3 downstream of the throttle 2 is low. At high load, or acceleration, the control valve 19 is closed, partly due to the increased pressure in the manifold, and partly to prevent a reduced response caused by the added hot mixture of air and hydrocarbons in the intake air. In addition, the increased pressure in the intake conduit of a normally aspirated engine prevents air from being drawn through the system at high load. For a supercharged engine, desorption is performed during high load by supplying the mixture to an intake apparatus for a turbocharger or compressor (not shown). This apparatus includes an injector valve or similar to achieve a vacuum for creating a sufficient flow of air through the conduits during desorption.

Experiments have shown that the addition of heated air to the intake air during low load, can in itself reduce the fuel consumption by up to 3%. The added mixture of air and hydrocarbon during regeneration can give a further reduction in the region of 0.05–0.1%.

The switching between the ventilating (adsorption) and regeneration (desorption) modes, including the operation of the fan 11 and the opening and closing of the first, second and third valves 6, 10, 19, is preferably controlled by a central processing unit $C_1$, or CPU, as shown in FIG. 3. The unit is also connected to the sensors, such as the adsorption unit saturation sensor $S_1$, the ambient air pollution level sensor $S_2$ and the optional temperature and humidity sensor $S_3$ in the passenger compartment. To determine whether the engine is switched off or its current operating state, the control unit accesses data from the engine management unit $C_2$.

In another embodiment, the apparatus used for the regeneration cycle is adapted for a further purpose. By opening the first and second control valves 6, 10 in the first and second ventilating ducts 7, 9, the heated air from the heat exchanger 13 is drawn into the passenger compartment. This heated air is, for instance, used for rapid defrosting. The air that would normally pass through the adsorbing filter to the engine is instead taken directly from the air filter 5. As for the normal regeneration process, this function is used once the engine reaches its normal operating temperature.

A modification of the embodiment shown in FIGS. 1 and 2 is used for removing pollutants from the exhaust gases during a cold start of the engine, before the catalytic converter has reached its light-off temperature.

Figure 5:
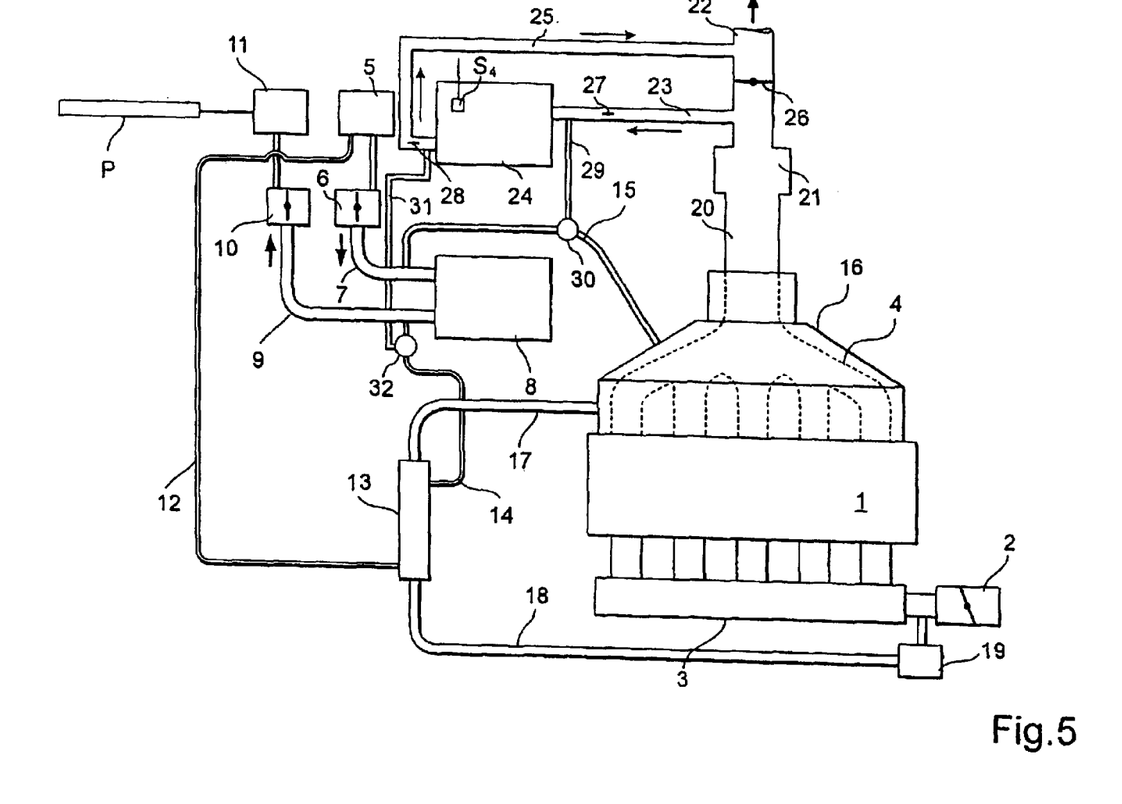
FIG. 5 shows an apparatus according to a further embodiment of the invention for an adsorbing operation during a cold start.

This embodiment is shown in FIG. 5. After the exhaust manifold 4, the exhaust system comprises a first exhaust conduit 20, a catalytic converter 21, and a second exhaust conduit 22, eventually leading out to the atmosphere. Immediately downstream of the catalytic converter 21 the second exhaust conduit 22 branches into a third exhaust conduit 23 connected to a second adsorbing filter 24. A fourth exhaust conduit 25 leads out of the second adsorbing filter 24 and is connected to the second exhaust conduit 22 downstream of the point where said branch for the third exhaust conduit 23. A controllable exhaust throttle 26 is arranged between the points where the third and fourth exhaust conduits 23, 25 are connected to the second exhaust conduit. The exhaust throttle 26 is normally open, but closes during the adsorption mode of the second adsorbing filter 24. The operation during the adsorption mode is shown in FIG. 5 and is as follows. During a cold start, the throttle 26 closes, forcing the exhaust through the adsorbing filter 24 via the third and fourth exhaust conduits 23, 25. The flow of exhaust through the filter continues until the existing catalytic converter 21 reaches its light-off temperature.

To desorb the second adsorbing filter 24, it is connected to the existing regeneration conduits. This is achieved by providing each of the third exhaust conduit 23 and the fourth exhaust conduit 25 with a first and second regeneration throttle 27, 28 respectively, upstream and downstream of the adsorbing filter 24. The first and second regeneration throttles 27, 28 are normally closed, but open during the adsorption mode of the second adsorbing filter 24. Between the first regeneration throttle 27 and the adsorbing filter 24, the third exhaust conduit 23 branches into a sixth regeneration conduit 29 that is connected to a first three-way valve 30 in the third regeneration conduit 15 in the existing regeneration apparatus shown in FIGS. 1 and 2. Similarly, between the second regeneration throttle 28 and the adsorbing filter 24, the fourth exhaust conduit 25 branches into a seventh regeneration conduit 31 that is connected to a second three-way valve 32 in the second regeneration conduit 14. The operation during the desorption mode in shown in FIG. 6 and is as follows. After the completion of a cold start adsorption sequence, the second adsorbing filter 24 can be regenerated. As for the first filter 8 this is initiated if a sensor S4 indicates that the filter 24 is fill or nearly full. The sensor S24 is connected to a central processing unit (see FIG. 3, "C1") that would function as described in connection with FIG. 3 above. Regeneration takes place, on the condition that the engine is running, that the catalytic converter 21 has reached its working temperature, and that the first adsorbing unit is not being regenerated. When these conditions are met, the three-way valves 30, 32 are operated to switch the flow of heated ambient air from the second regeneration conduit 14 through the seventh regeneration conduit 31, the second adsorbing filter 24, the sixth regeneration conduit 29, back to the third regeneration conduit 15. As soon as the second adsorbing filter 24 has been regenerated, the three-way valves 30,32 returns to their normal positions allowing a flow of air through the first adsorbing filter 8. As for the embodiment of FIG. 2, this flow of air through the regeneration conduits is created by the low pressure in the inlet manifold 3 when the third control valve is opened.

Figure 6:
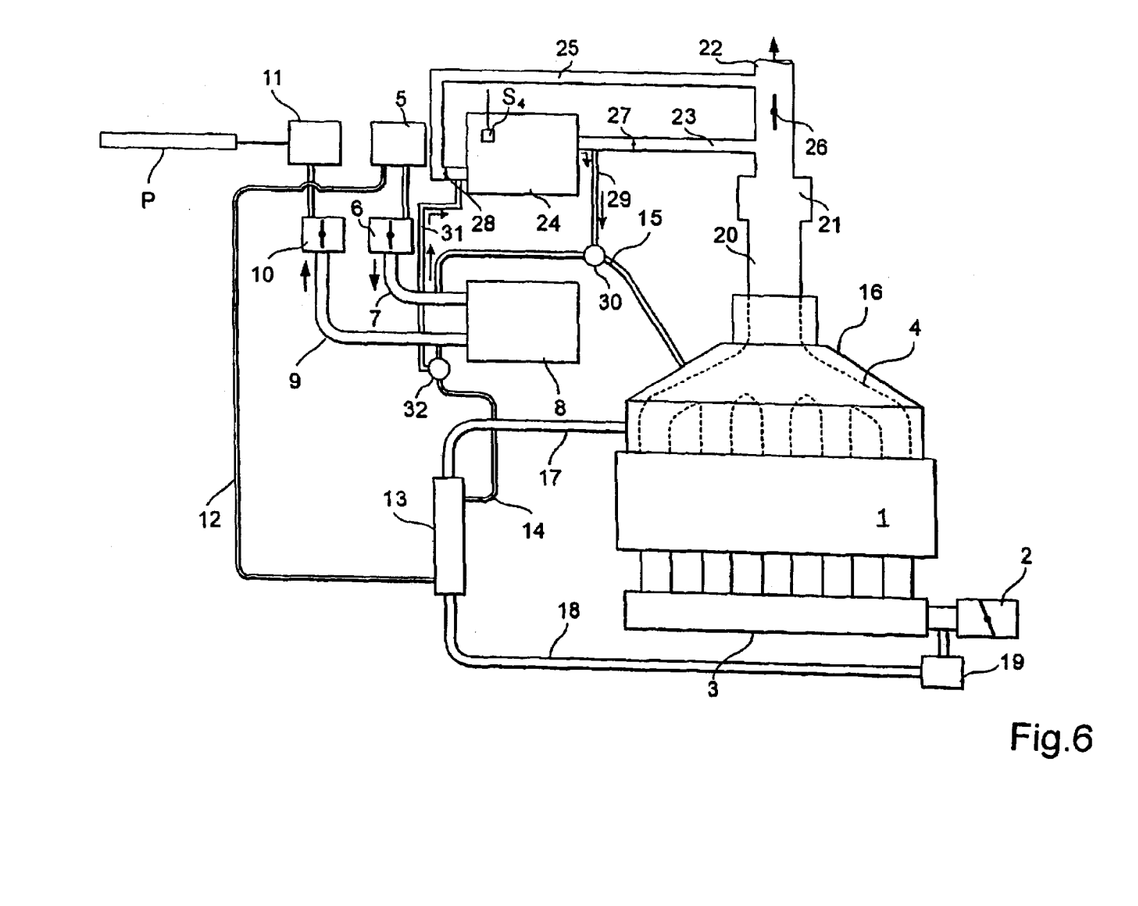
FIG. 6 shows the apparatus of FIG. 5 during regeneration of the adsorption unit.

As indicated by the arrows and the open first and second valves 6 and 10, adsorption of pollutants from the ambient air by the first adsorbing filter 8 continues uninterrupted during desorption of the second adsorbing filter 24.

The cold start apparatus is adapted to the embodiment described above, where ambient air is drawn directly to the double walled heat exchanger to be heated by the exhaust manifold (not shown). In this case, the second three-way valve 32 is positioned downstream of the temperature controller, but upstream of both the first and second adsorbing filters 8, 24. The second three-way valve 32 is positioned downstream of the first and second adsorbing filters 8, 24.

Although the above embodiments are intended to adsorb hydrocarbons the filter unit is adapted for other pollutants. By selecting an appropriate filter material, the adsorbing unit is adapted for specific molecules of alternative pollutants such as nitric oxides (NO and NO2), carbon monoxide, ozone or various other organic compounds.

We claim:

1. An apparatus for removing pollutant from ambient air by an adsorption unit (8) arranged in a vehicle, the vehicle including a combustion engine (1), having an inlet manifold (3) and an exhaust manifold (4), and a ventilation system (5, 6, 7, 8, 9, 10, 11) for a passenger compartment, characterized in that the apparatus has an adsorption mode which can be operated when the engine is running and when the engine is switched off, whereby the apparatus comprises; the apparatus comprising:
   a fan (11) in the ventilation system,
   a first air inlet (6) for ambient air,
   a first air outlet (10), arranged to supply air to a passenger compartment,
   an adsorption unit (8), arranged between said air inlet (6) and air outlet (10), wherein the apparatus has an adsorption mode operable when the engine is running and when the engine is switched off
   and that the apparatus has a desorption mode which can be operated when the engine is running, whereby the apparatus comprises;
   a second air inlet (6) for ambient air,
   a first heating means (13), arranged to heat the ambient air,
   the pollution adsorption unit (8), arranged to be desorbed by said heated ambient air,
   a second heating means (4, 16) for heating the mixture of air and pollutions, which heated mixture is arranged to heat the ambient air in the first heating means (13),
   a control valve (19) positioned between said first heating means and the inlet manifold (3), which valve is arranged to connect said second air inlet to a source of vacuum provided by the inlet manifold.

2. The apparatus according to claim 1, characterized in that, in adsorption, mode, in that the fan (19) is arranged to operate when at least one predetermined condition is fulfilled, said predetermined conditions are that one predetermined condition is that the engine (1) is switched off; n that one predetermined condition is that the level of pollution in ambient air exceeds a predetermined limit; and that both the air inlet (6) and air outlet (10) are open.

3. The apparatus according to claim 1, characterized in that, in desorption mode, the control valve (19) is arranged to open when at least one predetermined condition is fulfilled; said predetermined conditions are that one predetermined condition is that the engine (1) has reached its normal operating temperature; that one predetermined condition is that a sensor ($S_1$) has indicated that a predetermined saturation level of the adsorption unit; and that one predetermined condition is that both the air inlet (6) and air outlet (10) are closed.

4. The apparatus according to claim 1, characterized in that the airflow through the adsorbing unit (8) during desorption is reversed.

5. The apparatus according to claim 1, characterized in that the first heating means (13) is a heat exchanger.

6. The apparatus according to claim 1, characterized in that the second heating means (4, 16) is a heat exchanger arranged to be heated by the exhaust manifold (4).

7. The apparatus according to claim 1, characterized in that the apparatus further comprises means for adsorbing pollutants from the engine exhaust during a cold start, whereby said means includes:
   a second pollution adsorbing unit (24);
   an exhaust inlet (28), connecting an exhaust system of the vehicle with the second pollution adsorbing unit (24);
   an exhaust outlet (25), connecting the second pollution adsorbing unit (24) with the exhaust system;
   and that the apparatus has a desorption mode which can be operated when the engine is running, whereby the apparatus comprises;
   a first control valve (32), positioned between the first heating means (13) and the first pollution adsorbing unit (8)
   an inlet (31) for heated ambient air,
   the second pollution adsorption unit (24), arranged to be desorbed by said heated ambient air,
   an outlet (29) for the mixture of heated ambient six and pollutants,
   a second control valve (30), positioned between the first pollution adsorbing unit (8) and the second heating means (4, 16).

8. The apparatus according to claim 7, characterized in that the first and second control valves (30, 32) are arranged to connect the supply of heated ambient air to the pollution adsorbing units (8, 24) in turn.

9. The apparatus according to claim 7, characterized in that a first exhaust throttle (26) is positioned in the exhaust system between the exhaust inlet (23) and the exhaust outlet (25), which throttle is arranged to close during cold start.

10. The arrangement according to claim 7, characterized in that the the exhaust inlet (23) and the exhaust outlet (25) are each provided with a second and third exhaust throttle (27, 28) respectively, which throttles are arranged to close during desorption mode.

* * * * *